United States Patent [19]

Ishihara et al.

[11] Patent Number: 5,114,803
[45] Date of Patent: May 19, 1992

[54] SOLID OXIDE FUEL CELL AND POROUS ELECTRODE FOR USE IN THE SAME

[75] Inventors: Takeshi Ishihara, Toyoake; Tadashi Fujita, Nagoya; Hidenobu Misawa, Toyoake, all of Japan

[73] Assignee: NGK Insulators, Ltd., Japan

[21] Appl. No.: 724,152

[22] Filed: Jul. 1, 1991

[30] Foreign Application Priority Data

Jul. 7, 1990 [JP] Japan ................................. 2-178502

[51] Int. Cl.$^5$ ............................................. H01M 8/10
[52] U.S. Cl. ........................................ 429/30; 429/31; 429/40
[58] Field of Search ...................... 429/30, 31, 40, 44, 429/12; 427/115

[56] References Cited

U.S. PATENT DOCUMENTS 4,477,541 10/1984 Fraioli et al. .................... 429/30 X
5,021,304 6/1991 Ruka et al. ........................ 429/30

Primary Examiner—Anthony Skapars
Attorney, Agent, or Firm—Parkhurst, Wendel & Rossi

[57] ABSTRACT

A solid oxide fuel cell includes a one end-closed cylindrical porous air electrode tube, a solid electrolyte film provided on the outer periphery of the air electrode tube, and a fuel electrode film provided on the outer surface of the solid electrolyte film. A fuel gas is caused to flow around the outer periphery of the fuel electrode film, and an oxidizing gas is supplied into the inner space of the cylindrical air electrode tube to generate electric power. The pore diameter of that portion of the porous air electrode which is in contact with the solid electrolyte film is smaller than that of the surface portion of the porous air electrode on the side opposite to the interface.

18 Claims, 2 Drawing Sheets

FIG_1
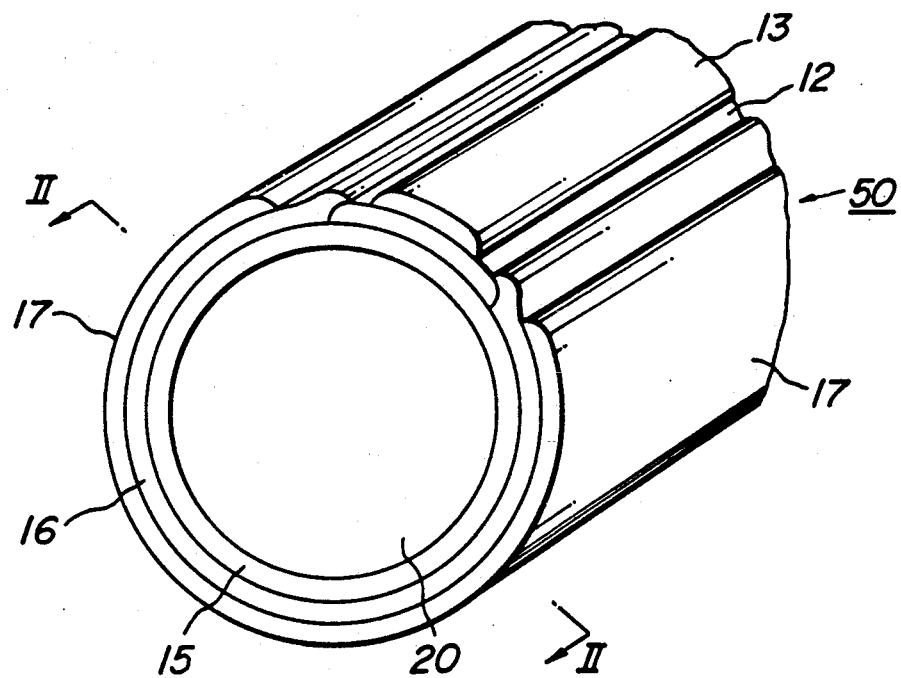
FIG_2
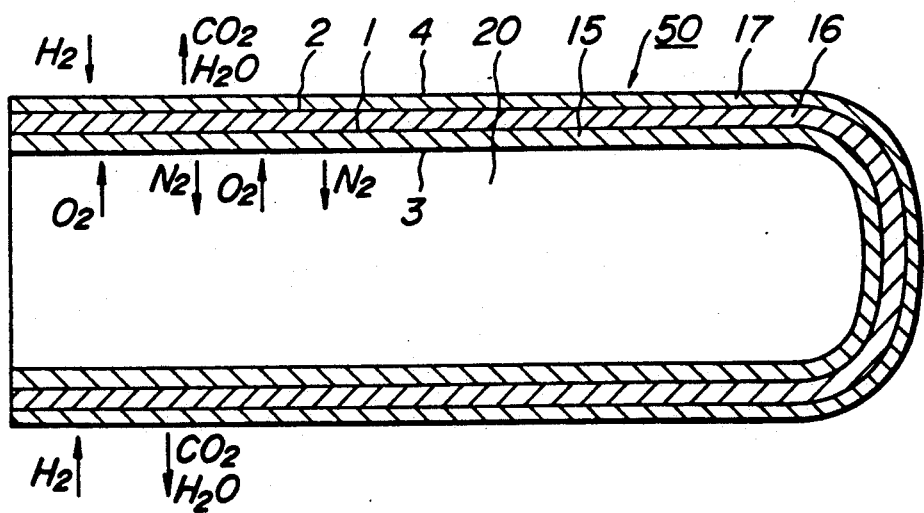

SOLID OXIDE FUEL CELL AND POROUS ELECTRODE FOR USE IN THE SAME

BACKGROUND OF THE INVENTION

1. Field Of The Invention

The present invention relates to a solid oxide fuel cell and a porous electrode to be used therefor.

2. Related Art Statement

Recently, fuel cells have been noted as power generating devices. Such a fuel cell is a device capable of directly converting chemical energy possessed by fuel to electric energy. Since the fuel cell is free from limitation of Carnot's cycle, the cell is a very promising technique owing to its high energy conversion efficiency, wide latitude of fuels to be used (naphtha, natural gas, methanol, coal reformed gas, heavy oil and the like), less public nuisance, and high electric power generation efficiency without being affected by the scales of installations.

Particularly, since the solid oxide fuel cell (referred to as "SOFC" hereinafter) operates at high temperatures of 1,000° C. or more, activity of electrodes is very high. Thus, catalyst of a noble metal such as expensive platinum entirely unnecessary. In addition, since the SOFC has low polarization and relatively high output voltage, its energy conversion efficiency is conspicuously much higher than those of other fuel cells. Furthermore, since constituent materials are all solid, the SOFC is stable and has long service life.

In order to produce such an SOFC, it has been proposed, for example, to form a one end-closed cylindrical porous support tube from an air electrode material having ion conductivity and electron conductivity, and successively form a solid electrolyte film and a fuel electrode film on a surface of the porous air electrode tube. An oxidizing gas is supplied into an internal space of the porous air electrode tube, while a fuel gas, such as $H_2$, $CH_4$ or the like is caused to flow along the outer periphery of the fuel electrode film. Consequently, the fuel gas reacts with oxygen ions, on the surface of the fuel electrode film, which have diffused through the solid electrolyte film. As a result, electric current flows between the air electrode film and the fuel electrode film to make it possible to use the SOFC as a cell for generating electric power.

In order to put the SOFC to practical use, generated power density per unit area of the cell needs to be increased for lowering its power generating cost. In order to increase the generated power density, it is required to enhance the diffusion of reactive gases in pores of the porous electrode material, to elevate the surface contact density of three-phase interface where cell reaction actually proceeds at the interface among the solid electrolyte and the electrode materials, and to lower the resistance to ion conductivity of the solid electrolyte film and electron conductivity of the electrode film.

In order to enhance the diffusion of reactive gases in pores of the porous electrode material, it is preferable to form the porous air electrode from a material containing pores which have a large diameter and are not largely curved. However, if the solid electrolyte film is formed on a surface of the material having large pores, the surface contact density of the three-phase interface could not be large. On the other hand, in order to make the surface contact density of the three-phase interface, large if a porous material containing small pores is used, the resistance to diffusion of gases in the porous air electrode becomes large. The same is also applicable to the fuel electrode film.

SUMMARY OF THE INVENTION

It is an object of the present invention to provide a solid oxide fuel cell and a porous electrode to be used therein, which eliminate all the disadvantages of the prior art and are able to improve diffusion of gases through the electrodes. The fuel cell and the porous electrode maintain the surface contact density of the three-phase interface at a high level, and increase output power.

In order to accomplish this object, the present invention relates to the solid oxide fuel cell including a solid electrolyte film having an ion conductivity and a porous electrode joined to the solid electrolyte film, and is characterized in that the pore diameter of that portion of the porous electrode which is in contact with the solid electrolyte film is smaller than that of the surface portion of the porous electrode which is on the side opposite to the interface between the solid electrolyte film and the porous electrode.

Moreover, the present invention also relates to the porous electrode for the solid oxide fuel cell, wherein the porous electrode having has one surface on which a solid electrolyte film having ion conductivity is to be formed, and is characterized in that the pore diameter of the porous electrode on the side of the one surface is smaller than that of the porous electrode on the side of the other surface.

The term "electrode" used herein is to mean the air electrode or fuel electrode.

The invention will be more fully appreciated by referring to the following description of the invention when taken in conjunction with the appended drawings, with the understanding that some modifications, changes or variations could be made by the person skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a fragmentary perspective view illustrating a one end-closed cylindrical solid oxide fuel cell according to the invention;

FIG. 2 is a sectional view of the cell taken along the line II—II in FIG. 1.

DETAILED DESCRIPTION OF THE INVENTION

Figure 3:
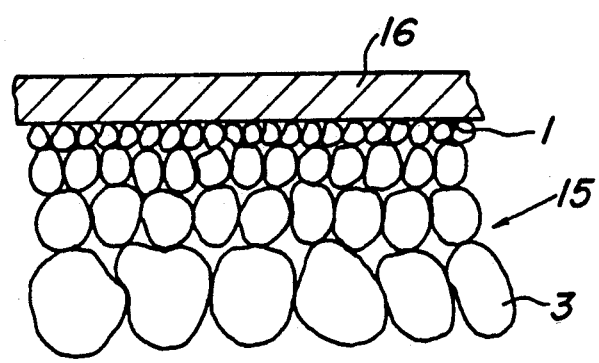
FIGS. 3 and 4 are schematic sectional views illustrating, in an enlarged scale, two patterns of particle size distribution in the air electrode tube according to the invention, respectively.

Referring to FIGS. 1 and 2 illustrating one example of one-end closed cylindrical SOFC elements in section, wherein a one end-closed cylindrical air electrode tube 15 is provided with a solid electrolyte film 16 and a fuel electrode film 17 along the outer periphery of the air electrode tube 15. Moreover, as viewed in FIG. 1, an interconnector 12 is provided on the upper zone of the air electrode tube 15 and a connection terminal 13 is attached onto the interconnector 12. In order to connect a plurality of end-closed cylindrical SOFC elements 50 in series, an air electrode tube 15 of an SOFC element is connected to a fuel electrode film 17 of an adjacent SOFC element through an interconnector 12 and a connection terminal 13. On the other hand, when the one end-closed cylindrical SOFC elements 50 are to be connected in parallel, fuel electrodes films 17 of two adjacent SOFC elements are connected to each other through an Ni felt or the like.

A fuel gas is caused to flow around the outer periphery of the fuel electrode film 17 and an oxidizing gas is supplied into the internal space 20 of the one end-closed cylindrical air electrode tube 15 to effect power generation.

The air electrode tube 15 may be made of $LaMnO_3$, $CaMnO_3$, $LaNiO_3$, $LaCoO_3$, $LaCrO_3$ or the like doped or not, and preferably $LaMnO_3$ added with strontium. The solid electrolyte film 16 may be generally made of yttria stabilized zirconia or the like. The fuel electrode film 17 may be generally made of nickel-zirconia cermet or cobalt-zirconia cermet.

The first particular feature of SOFC of this embodiment lies in that pores in the porous air electrode tube 15 are so distributed that the diameter of the pores gradually changes. In other words, the pores are so distributed that their diameters change, for example, continuously in directions of the thickness of the air electrode tube. The pore diameter may be changed stepwise in a manner substantially exhibiting a function similar to that in the case of the gradual changing of the pore diameters for the convenience of manufacture. Namely, the pore diameter in that portion of the air electrode tube 15 which is in contact with the solid electrolyte film 16 is set small, while the pore diameter in that portion of the air electrode tube 15 which is located on the side of the inner space 20 of the tube is set relatively large.

According to the invention, the pore diameter is set to substantially continuously change in the direction of the thickness of the air electrode tube 15 in this manner different from air electrode tubes of the prior art whose pore diameter is uniformly set. With this feature of the present invention, by making relatively fine the particles of the material in that portion of the air electrode tube which is in contact with the solid electrolyte film 16, it is possible to increase the contact density per unit area of the three-phase interface where the solid electrolyte, particles of the air electrode material and the reactive gas contact each other. As a result, the activity of the electrode at the interface 1 can be promoted. Moreover, since the particles of the air electrode tube 15 in contact with the solid electrolyte film 16 can be made fine, unevenness of the surface of the air electrode tube 15 on the side of the interface 1 is small and gaps among the particles in this surface are also small. Therefore, the solid electrolyte film 16 can be easily formed on the surface of the air electrode tube so that it is possible to make the solid electrolyte film 16 thinner.

Furthermore, since the pore diameter of the surface portion 3 of the air electrode tube 15 on the side of the inner space 20 is relatively large, it is possible to lower diffusion resistance to diffusion of oxygen from the inner space 20 and diffusion of nitrogen into the inner space 20, with the result that the activity of electrode and power generation efficiency are synergistically enhanced together with the increase of reacting points at the interface 1 above described. The portion having the large pore diameter or large particles and the portion having the small pore diameter or small particles are separately fired at respectively suitable temperatures to sufficiently join the particles to each other by sintering. As a result, the found areas and found strength of the particles are increased so that the mechanical strength of the air electrode tube 15 is kept high. Moreover, there is an additional effect that electric resistance of the air electrode tube decreases owing to the increased bound areas of the particles.

Moreover, the pore diameter of that portion of the fuel electrode film 17 which is in contact with the solid electrolyte film 16 at an interface 2 is also made smaller than that of the surface portion 4 of the fuel electrode film 17 which is on an opposite side of the interface 2. This arrangement of the pore diameter increases the reacting points at the interface 2 and lowers diffusion resistance to diffusion of $H_2$, $CH_4$ on the like from the side of the surface 4 or diffusion of $H_2O$ and $CO_2$ from the surface 4 to the exterior. The reaction in the electrode is further promoted and the power generation efficiency is enhanced due to these synergistic effects.

In general, nickel particles are comparatively difficult to attach to a solid electrolyte film. However, even if the fuel electrode film 16 is formed by nickel-zirconia cermet, the fuel electrode film 16 according to this embodiment is very advantageous in attaching the nickel particles because of the relatively fine nickel particles arranged on the side of the interface 2.

The distribution of the pore diameter in the air electrode tube 15 and the fuel electrode film 17 is broadly classified into two patterns.

Figure 4:
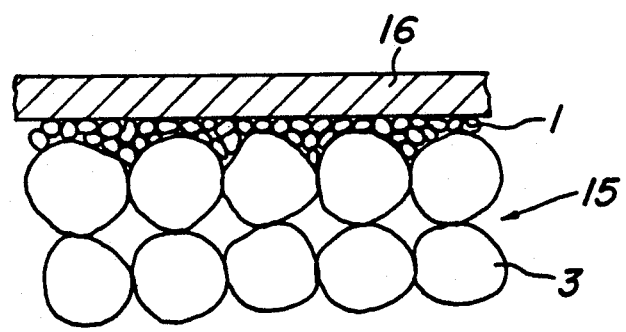

(1) The pore diameter, porosities and diameters of the constituent particles are decreased stepwise in the direction of thickness of the air electrode tube 15 (the fuel electrode film 17) from the surface 3 (4) onto the interface 1 (2) as schematically illustrated in FIG. 3. (2) The entire air electrode tube 15 (the fuel electrode film 17) is formed by relatively large particles and that portion of the tube 15 (the film 17), which is on the side of the interface 1 (2) only is densely filled with particles of small diameters as schematically illustrated in FIG. 4.

The ratio in the pore diameter between the surface portion 3 (4) and that near the interface 1 (2) is preferably from 100:1 to 5:1, and more preferably from 30:1 to 10:1.

Moreover, the ratio of porosity in the surface 3 (4) to that near the interface 1 (2) is preferably from 40:20 to 30:25.

In producing the above SOFC, the air electrode tube 15 is first produced, and the solid electrolyte film 16 is then formed on one surface of the air electrode tube 15. This one surface of the electrode tube 15 forms the interface 1 between the air electrode tube 15 and the solid electrolyte film 16. Further, the fuel electrode film 17 is formed on the solid electrolyte film 16.

The pore diameter of the air electrode tube 15 is distributed so as to progressively change from one surface to the other surface in the following ways.

First, a raw material having a large particle size is formed into a one end-closed cylindrical shape by a suitable forming method such as pressing, extruding or the like. A slurry or slurries containing particles having diameters smaller than that of the raw material are successively coated on the surface of the formed body by spraying, dipping or the like to form a green body of a laminated structure consisting of two or more layers. This green body is entirely sintered to produce an air electrode tube having the pore diameter progressively changed corresponding to the pattern (1). As an alternative, the surface portion of the one end-closed cylindrical formed body is densely filled with a slurry containing particles of small diameters by spraying or the like to form a green body. The green body is then fired to produce an air electrode tube corresponding to the pattern (2). By firing the laminated structures in lump in this manner, the air electrode tube 15 can be produced in less steps so that the processing time and cost can be reduced.

On the other hand, the above way may be modified in the following manner. A formed body made of large particles is once fired to obtain a fired body. Thereafter, one surface of the fired body is coated with a slurry of particles smaller than those of the formed body and is then fired again. In this method, firing is effected repeatedly every time upon coating with slurry different in particle diameters. Since small particles coated onto the formed body are relatively susceptible to firing, if these small particles are repeatedly fired under the same conditions as these large particles, there is a tendency that the small particles undergo large contraction in firing, and porosity is likely to become small. Therefore, the firing should be effected under firing conditions meeting the particle sizes of respective particles. For example, the portion composed of large particles is fired at higher temperatures, while the portion composed of small particles is fired at lower temperatures. With such a selection of firing conditions, the distribution of the pore diameter of the electrode tube in the thickness direction can be met with the desired pattern.

In the above producing method, after the air electrode tube 15 is once fired, one surface 1 of the fired body is coated with $Y_2O_3$-stabilized zirconia (YSZ) paste and fired to obtain the solid electrolyte film. Different from this process, however, it may be that a green body for the air electrode tube 15 is coated on its surface with the YSZ paste and fired so that the air electrode tube 15 and the solid electrolyte film 16 may be simultaneously formed.

In forming the air electrode tube 15, it is preferable to use a raw material of particles having a shape of a small ratio of a surface area to a volume, and being difficult to orient substantially in the same direction, for example, a spherical shape, a polyhedral shape or the like. It is preferable for pore formation to use a raw material of substantially needle-shaped or plate-shaped particles which tend to orient substantially in the same direction. In the event that the raw material of substantially needle-shaped or plate-shaped particles is used, the particles tend to orient in directions parallel with the surface of a formed body in forming it by pressing or extrusion. Consequently, venting holes in the formed body will form serpentine passages to increase diffusion resistance.

The diameter of coarsest particles of the raw material for producing the air electrode tube 15 is preferably 10–100 μm. On the other hand, the diameter of finest particles of the raw material is preferably 0.1–1 μm. The ratio in the diameters of the coarsest particles and the finest particles is preferably between 10–1,000.

Among the particles forming the respective layers having different particle sizes, the coarse particles form a porous skeleton. The relatively fine particles are present in connecting portions among the particles in the coarse particle skeleton so as to reinforce the bonding of the coarse particles to make the particle aggregate a stable structure.

Moreover, with that portion of the air electrode tube which is on the side near the other surface 3, it is preferable to make its electric resistance small and its mechanical strength high. The coefficient of thermal expansion of the material of the electrode needs to be substantially equal to that of the solid electrolyte. However, in the case that the electrode is of a laminated structure, it may be that the coefficient of thermal expansion of respective layers is changed successively so that the coefficient of thermal expansion on the side adjacent the electrolyte is exactly close to that of the electrolyte, while the coefficient of thermal expansion of the portion not close to the electrolyte is gradually changed and made different from that of the electrolyte.

Moreover, in order to obtain the green body having the pore diameter successively changed, a particle sedimentation method may be employed using a plurality of kinds of particles having different particle diameters.

Moreover, it may be that after a formed body composed of particles having relatively large diameters has been fired to obtained a fired body, the fired body is formed on its surface with a film having a relatively small porosity by physical vapor deposition or chemical vapor deposition to obtain the air electrode tube 15 (Japanese Patent Application Laid-open No. 61-209,005). As an alternative, it may be that a hydrosol solution containing titanium hydroxide or titanium oxide is carried on the surface of the above fired body, which is dried and fired at a temperature of 300°–700° C. to form a porous film (Japanese Patent Application Laid-open No. 1-304,606). Moreover, a hydrophobic film or a film containing a hydrophobic substance may be formed on the surface of the fired body (Japanese Patent Application Laid-open No. 63-287,504). Further, a carrier sol liquid may be coated on a porous sintered body to form a porous film (Japanese Patent Application Laid-open No. 1-299,611).

In producing the fuel electrode film 17, similar methods to those above described may be fundamentally applicable. However, if a slurry containing small particles is first coated on a solid electrolyte film 16 and fired, and then a slurry containing large particles is further coated thereon and fired, it is feared that the first fired fine particle layer on the side of the interface 2 is clogged. Therefore, it is preferable that a slurry containing large particles is first coated on a solid electrolyte film 16 and fired, and then the surface of the fired body is impregnated with a slurry of small particles so that the small particles are caused to penetrate at the interface 2.

Although the one end-closed cylindrical air electrode tube 15 is used in the above embodiment, a one end-closed cylindrical fuel electrode tube may be employed in this invention, which is made of nickel-zirconia cermet or the like. In this case, a fuel gas is supplied into the inner space of the fuel electrode tube, whereas an oxidizing gas is caused to flow therearound.

Moreover, although the one end-closed cylindrical porous air electrode tube 15 is used in the above embodiment, the present invention is also applicable to a SOFC in which a one end-closed cylindrical porous support tube (electron conductive) is successively provided on its surface with an air electrode film, a solid electrolyte film and a fuel electrode film. In this case, the pore diameters of the air electrode film are progressively changed in the direction of its thickness.

Instead of the one end-closed cylindrical air electrode tube, various shapes of the tubes such as rectangular or hexagonal columnar shapes may be used, opposite ends of the air electrode having a cylindrical shape, and may be open. Moreover, a plate-shaped air electrode may also be used.

Results of actual experiments will be explained hereinafter.

Air electrode tubes as shown in FIG. 1 were made of $LaMO_3$ doped with strontium ($La/Sr=0.9/0.1$). In more detail, a raw material was extruded to form extruded bodies, which were fired at 1,400° C. to obtain bases having a thickness of 1,000 μm. Thereafter, a slurry was coated on each of the bases by dipping, followed by firing. The operation of dipping-firing was repeated five times. Particles contained in the respective slurries were made successively finer, and sintering temperatures were successively decreased from 1,400° to 1,380° C. The air electrode tubes having a thickness of 2,000 μm were prepared in this manner (Experiments II and III). Separately therefrom, the same raw material was extruded to form extruded bodies, which were fired at 1,400° C. to obtain air electrode tubes having a substantially uniform pore diameter.

Thereafter, a yttrium-stabilized zirconia paste was coated on the surfaces of each of the above air electrode tubes and fired to form a solid electrolyte film having a thickness of 100 μm. Further, nickel-zirconia cermet (Ni:yttria-stabilized zirconia=6:4 in volume ratio) was coated on the solid electrolyte film, which was fired at 1,350° C. to obtain a fuel electrode film having a thickness of 200 μm.

With respect to the above solid oxide fuel cells, the pore diameter and porosities of a portion of the air electrode tube at the interface 1 between the solid electrolyte film and those of the surface portion 3 the opposite side of the interface were measured. Moreover, electric current was measured when voltages of 0.7 volts was applied to the cell. Results are shown in Table 1.

TABLE 1

|  | Electrolyte side | | Air flow path side | | Electric current at 0.7 volt cell voltage |
|---|---|---|---|---|---|
|  | Average pore diameter | Porosity | Average pore diameter | Porosity |  |
| Experiment I | 0.7 μm | 15% | 0.7 μm | 15% | 200 mA |
| Experiment II | 0.7 μm | 20% | 8.5 μm | 25% | 250 mA |
| Experiment III | 1.3 μm | 25% | 26.8 μm | 37% | 300 mA |

It is apparent from Table 1 that the solid oxide fuel cell according to the invention can remarkably improve the power generation.

As can be seen from the above explanation, with the solid oxide fuel cell according to the invention, the pore diameter of that portion of the porous electrode which is in contact with the interface adjacent the solid electrolyte is smaller than that of the surface portion of the porous electrode on the side opposite to the interface. Therefore, particles of that portion of the porous electrode which faces to the interface are relatively fine so that the number and area of triple points, i.e., the three-phase interface become large and the pore diameter of the surface portion also becomes relatively large. Consequently, it is possible to lower resistance to the diffusion of oxygen from the surface portion and the diffusion of unnecessary gases from the surface to the exterior. Therefore, the reaction at the electrode can be accelerated and power generation efficiency can also be enhanced by the synergistic effects thereof.

Moreover, since the pore diameter of that surface portion of the electrode which is on the side opposite to the interface is relatively large, sizes of the particles therein can be large so that the bound area of the particles can be increased to lower electric resistance of the porous electrode. This also contributes to improvement of the power generation efficiency in conjunction with the effects above described.

In the solid oxide fuel cell according to the invention, the pore diameter of one surface portion of the porous electrode on which the solid electrolyte film is formed is smaller than that of the other surface portion, so that unevenness on the side of the one surface portion can be relatively small, and clearances between the particles can be made smaller. Consequently, the solid electrolyte film can be made thinner.

What is claimed is:

1. A solid oxide fuel cell including a solid electrolyte film having ion conductivity and a porous electrode film joined to the solid electrolyte film, wherein a pore diameter of that portion of said porous electrode which is in contact with the solid electrolyte film at an interface therebetween is smaller than that of the surface portion of the porous electrode which is located on the side opposite to the interface.

2. The solid oxide fuel cell as set forth in claim 1, wherein diameters of particles of that portion of said porous electrode which is in contact with the solid electrolyte film are smaller than that of the surface portion on the side opposite to the interface.

3. The solid oxide fuel cell as set forth in claim 1, wherein the pore diameter of the porous electrode is stepwise increased in the direction of a thickness of the electrode from the side of the interface to the side opposite to the interface.

4. The solid oxide fuel cell as set forth in claim 1, wherein said porous electrode is made of relatively large particles as a whole and filled with smaller particles in that portion of the porous electrode which is in contact with the solid electrolyte film.

5. The solid oxide fuel cell as set forth in claim 1, wherein a ratio in the pore diameter between the portion of the porous electrode in contact with the solid electrolyte film and that of the portion on the side opposite to the interface is in a range from 1:5 to 1:100.

6. The solid oxide fuel cell as set forth in claim 5, wherein said ratio is in a range from 1:10 to 1:30.

7. The solid oxide fuel cell as set forth in claim 1, wherein a ratio in porosity between the portion in contact with the solid electrolyte film and that of the portion on the side opposite to the interface is in a range from 20:40 to 25:30.

8. The solid oxide fuel cell as set forth in claim 1, wherein a diameter of the coarsest particles of the porous electrode are in a range from 10 to 100 μm, and that of the finest particles of the porous electrode are in a range from 0.1 to 1 μm.

9. The solid oxide fuel cell as set forth in claim 8, wherein a ratio in the diameter between the coarsest particles and the finest particles is in a range from 10 to 1,000.

10. A porous electrode for a solid oxide fuel cell, said porous electrode having one surface on which a solid electrolyte film having an ionic conductivity is to be formed, wherein a pore diameter of the porous electrode on the side of said one surface is smaller than that of the porous electrode on the other surface.

11. The porous electrode as set forth in claim 10, wherein a diameter of particles of that portion of said porous electrode which is in contact with the solid electrolyte film is smaller than that of the surface portion on the side opposite to the interface.

12. The porous electrode as set forth in claim 10, wherein the pore diameter of the porous electrode is stepwise increased in the direction of a thickness of the electrode from the side of interface to the side opposite to the interface.

13. The porous electrode as set forth in claim 10, wherein said porous electrode is made of relatively large particles as a whole and filled with smaller particles in that portion of the porous electrode which is in contact with the solid electrolyte film.

14. The solid oxide fuel cell as set forth in claim 10, wherein a ratio in pore diameter between the portion in contact with the solid electrolyte film and the portion on the side opposite to the interface is in a range from 1:5 to 1:100.

15. The porous electrode as set forth in claim 14, wherein said ratio is in a range from 1:10 to 1:30.

16. The porous electrode as set forth in claim 10, wherein a ratio of porosity between the portion in contact with the solid electrolyte film and the portion on the side opposite to the interface is in a range from 20:40 to 25:30.

17. The porous electrode as set forth in claim 10, wherein diameter of the coarsest particles of the porous electrode is a range from 10 to 100 $\mu$m, and that of the finest particles of the porous electrode is in a range from 0.1 to 1 $\mu$m.

18. The porous electrode as set forth in claim 17, wherein a ratio in the diameter between the coarsest particles and the finest particles is in a range from 10 to 1,000.

* * * * *